(12) United States Patent
Saji (10) Patent No.: US 8,529,163 B2
(45) Date of Patent: Sep. 10, 2013

(54) TEMPORARY COUPLING MECHANISM FOR CUTTING TIP AND INDEXABLE CUTTING TOOL WITH SAME

(75) Inventor: Ryuichi Saji, Iwaki (JP)

(73) Assignee: Tungaloy Corporation, Iwaki-shi, Fukushima (JP)

(\*) Notice: Subject to any disclaimer, the term of this patent is extended or adjusted under 35 U.S.C. 154(b) by 395 days.

(21) Appl. No.: 12/959,867

(22) Filed: Dec. 3, 2010

(65) Prior Publication Data

US 2011/0135408 A1    Jun. 9, 2011

Related U.S. Application Data

(63) Continuation-in-part of application No. PCT/JP2009/060286, filed on Jun. 4, 2009.

(30) Foreign Application Priority Data

Jun. 4, 2008  (JP) .................................. 2008-146345

(51) Int. Cl.
*B23C 5/22* (2006.01)

(52) U.S. Cl.
USPC .............................................. 407/40; 407/47

(58) Field of Classification Search
USPC ................ 407/40, 46, 47, 48, 49, 50
See application file for complete search history.

(56) References Cited

U.S. PATENT DOCUMENTS

| 4,484,560 | A | \* | 11/1984 | Tanigawa | ........................... | 125/15 |
| 6,126,364 | A | \* | 10/2000 | Riviere | ............................ | 407/15 |
| 6,503,027 | B2 | \* | 1/2003 | Men | ................................ | 407/33 |

(Continued)

FOREIGN PATENT DOCUMENTS

| DE | 10333621 A1 | \* | 2/2005 |
| EP | 1291105 A1 | \* | 3/2003 |

(Continued)

OTHER PUBLICATIONS

Official Action dated Jul. 25, 2012 issued in Korean counterpart application (No. 10-2010-7027277) *with translation*.

(Continued)

*Primary Examiner* — Daniel Howell
*Assistant Examiner* — Nicole N Ramos
(74) *Attorney, Agent, or Firm* — Womble Carlyle (57) ABSTRACT

A temporary coupling mechanism facilitates replacement of a cutting tip in a pocket of a cutting tool, by preventing the cutting tip from falling out of the pocket when a clamping member, e.g., a screw member or wedge member, is loosened. The pocket is provided with a first coupling portion and the cutting tip is provided with a second coupling portion configured to engage the first coupling portion. In one embodiment, the second coupling portion is at least one concave groove or convex portion located in a predetermined position of the cutting tip. A convex portion or a concave groove is provided in at least one of the pocket's tip mounting seat and the clamping member to engage the concave groove and the convex portion of the cutting tip. The concave groove extends substantially in parallel with the seat face of the tip mounting seat and the convex portion is inserted and fitted into the concave groove so as to be engaged thereto when the cutting tip is inserted into the tip mounting seat and is taken out of the tip mounting seat, causing the cutting tip to be movable only in a predetermined direction relative to the tip mounting seat.

22 Claims, 9 Drawing Sheets

(56) References Cited

U.S. PATENT DOCUMENTS

| | | | |
|---|---|---|---|
| 7,101,121 B2 * | 9/2006 | Wermeister et al. | 407/113 |
| 7,670,088 B2 | 3/2010 | Andersson et al. | |
| 2002/0159846 A1 | 10/2002 | Horiike et al. | |
| 2003/0017014 A1 | 1/2003 | Morgulis et al. | |
| 2007/0020052 A1 * | 1/2007 | Cirino | 407/46 |
| 2010/0150670 A1 | 6/2010 | Hecht | |

FOREIGN PATENT DOCUMENTS

| | | | |
|---|---|---|---|
| JP | H06-021614 | | 6/1994 |
| JP | 2001-315022 | | 11/2001 |
| JP | 2007-130738 | | 5/2007 |
| JP | 2007152552 A | * | 6/2007 |
| JP | 2008-080468 | | 4/2008 |
| JP | 2008080470 A | * | 4/2008 |
| WO | WO 03004204 A1 | * | 1/2003 |

OTHER PUBLICATIONS

Official Action dated Jul. 25, 2012 issued in Chinese counterpart application (No. 200980120796.1) *with translation*.

International Search Report in PCT/JP2009/060286, dated Sep. 1, 2009.

* cited by examiner

TEMPORARY COUPLING MECHANISM FOR CUTTING TIP AND INDEXABLE CUTTING TOOL WITH SAME

RELATED APPLICATIONS

This is a Continuation-in-Part of International Application No. PCT/JP2009/060286, filed 4 Jun. 2009 and published as WO 2009/148135 on 10 Dec. 2009, which claims priority to JP 2008-146345, filed 4 Jun. 2008. The contents of the aforementioned International and priority applications are incorporated by reference in their entirety.

TECHNICAL FIELD

The present invention relates to a temporary coupling mechanism for a cutting tip and an indexable cutting tool equipped with the mechanism.

BACKGROUND ART

An indexable face milling cutter which is this type of cutting tool has a concave portion at an outer periphery in the front end portion of a tool body to open toward a radial outside of the tool body and a front end side of the tool body. This concave portion is configured to form therein a mounting seat for removably installing a cutting insert (cutting tip) having a cutting blade. A seating member is disposed in the mounting seat and the seating member has a wall face directed at a radial outside of the tool body and a wall face directed at a forward side in a tool rotational direction, which are formed so as to extend toward the front end side of the tool body. The cutting insert is seated on the wall face directed at the forward side in the tool rotational direction of the seating member, and a side face of the cutting insert directed at a radial inside of the tool body contacts with the wall face of the seating member directed at the radial outside of the tool body, thus pressing the cutting insert toward a backward side in the tool rotational direction by a wedge member. See Japanese Patent Laid-Open No. 2007-130738, esp. FIG. 4.

In the face milling cutter described in Japanese Patent Laid-Open No. 2007-130738, however, when the cutting insert is inserted into and taken out of the mounting seat by releasing a pressing pressure of the wedge member in a state where the opening of the concave portion in the tool body is directed in the gravity direction, the cutting insert is possibly dropped and missed. Therefore, it can not be easy to perform a replacement operation of a small-size cutting insert or a replacement operation thereof on a machine tool.

The present invention is made for solving the aforementioned problem and an object of the present invention is to provide a temporary coupling mechanism for a cutting tip suitable for facilitating a removable operation of a cutting tip to a tip mounting seat and an indexable cutting tool equipped with the mechanism.

SUMMARY OF INVENTION

The present invention has the following construction for solving the aforementioned problem.

The present invention relates to a temporary coupling mechanism for a cutting tip inserted into a tip mounting seat provided in a tool body of a cutting tool, comprising a tip mounting seat including a notch step portion or a concave groove equipped with a seat face and at least one restricting wall face rising up from the seat face, a clamping member for pressing the cutting tip inserted into the tip mounting seat toward the seat face, at least one of a concave groove or at least one convex portion located in a predetermined position of the cutting tip, and a convex portion or a concave groove provided in at least one of the tip mounting seat and the clamping member to be capable of being engaging to the concave groove or the convex portion of the cutting tip, wherein the concave groove extends substantially in parallel with the seat face of the tip mounting seat and the convex portion is inserted and fitted into the concave groove so as to be able to be engaged thereto when the cutting tip is inserted into the tip mounting seat and is taken out of the tip mounting seat, causing the cutting tip to be movable only in a predetermined direction relative to the tip mounting seat.

According to the temporary coupling mechanism for the cutting tip, by inserting and fitting the convex portion into the concave groove so as to be able to be engaged thereto when the cutting tip is inserted into the tip mounting seat and is taken out of the tip mounting seat, the movement of the cutting tip in other directions other than the inserting and fitting direction is restricted. In this way, since the cutting tip is not shifted within the tip mounting seat or the cutting tip does not drop out from the tip mounting seat even if gravity is applied in the direction where the movement of the cutting tip is restricted, a removal operation of the cutting tip becomes easy and therefore hours required for the operation are shortened.

In the temporary coupling mechanism for the cutting tip, it is preferable that the concave groove extends in a direction along at least the one restricting wall face. With this configuration, since the cutting tip is movable only in the direction along the restricting wall face within the tip mounting seat, the insert and the removal of the cutting tip into and from the tip mounting seat become easy. In consequence, the removal operation of the cutting tip to the tip mounting seat becomes easy and therefore hours required for the operation are shortened.

Further, the convex portion may extend or be scattered in a direction along at least the one restricting wall face. With this configuration, the convex portion and the concave groove are engaged to each other in a wide range in the direction along the restricting wall face to stabilize the posture of the cutting tip within the tip mounting seat. In consequence, a removal operation of the cutting tip becomes easy to shorten hours required for the operation, as well as to improve positioning accuracy of the cutting tip.

Further, it is preferable to obtain a secure engagement between the convex portion and the concave groove by forming a cross sectional configuration of the convex portion and a cross sectional configuration of the concave groove to be analogous.

According to the indexable cutting tool equipped with the temporary coupling mechanism for the cutting tip, by inserting and fitting the convex portion into the concave groove so as to be able to engaged thereto when the cutting tip is inserted into the tip mounting seat and is taken out of the tip mounting seat, the movement of the cutting tip in other directions other than the inserting and fitting direction is restricted. In this way, since the cutting tip is not shifted within the tip mounting seat or the cutting tip does not drop out from the tip mounting seat even if gravity is applied in the direction where the movement of the cutting tip is restricted, for example, at the time of performing a corner change of the cutting tip or a tip replacement in a state of mounting the cutting tool in a main axis or on a tool post of the machine tool, a removal operation of the cutting tip to the cutting tool becomes easy and therefore hours required for the operation are shortened.

It is preferable that in the indexable cutting tool, a size of the cross sectional configuration in the concave groove relative to that of the cross sectional configuration in the convex portion is larger at an outer side end portion of the concave groove positioned at an outer side of the tool body in the cutting tool than at an inner side end portion of the concave groove positioned at an inner side of the tool body in the cutting tool. With this configuration, since it is easier to insert and fit the convex portion into the concave groove at the time of inserting the cutting tip into the tip mounting seat, a cutting tip mounting operation to the cutting tool becomes easy. Also the engagement between the convex portion and the concave groove is not weakened.

It is desirable to extend the concave groove in a direction intersecting with a vertical direction, preferably in a direction intersecting at 60 degrees to 90 degrees with a vertical direction. In consequence, the movement of the cutting tip in the vertical direction is restricted when the cutting tip is inserted into the tip mounting seat and is taken out of the tip mounting seat. Thereby, for example, when the cutting tool is mounted on a tool machine such as a vertical milling machine or a vertical machining center with the front end side (tip side) directed downward in the vertical direction, the cutting tip does not drop out from the tip mounting seat to be missed and also a removal operation of the cutting tip to the cutting tool becomes easy and hours required for the operation are shortened. For securely preventing the cutting tip from dropping out from the tip mounting seat, it is preferable that the extending direction of the concave groove intersects at angles of 60 degrees to 90 degrees with the vertical direction.

According to the aforementioned temporary coupling mechanism for the cutting tip and the indexable cutting tool equipped with the mechanism, the insert and the removal of the cutting tip into and from the tip mounting seat become easy. In consequence, a removal operation of the cutting tip to the tip mounting seat and the cutting tool becomes easy, and hours required for the operation are shortened.

DETAILED DESCRIPTION

Figure 1:
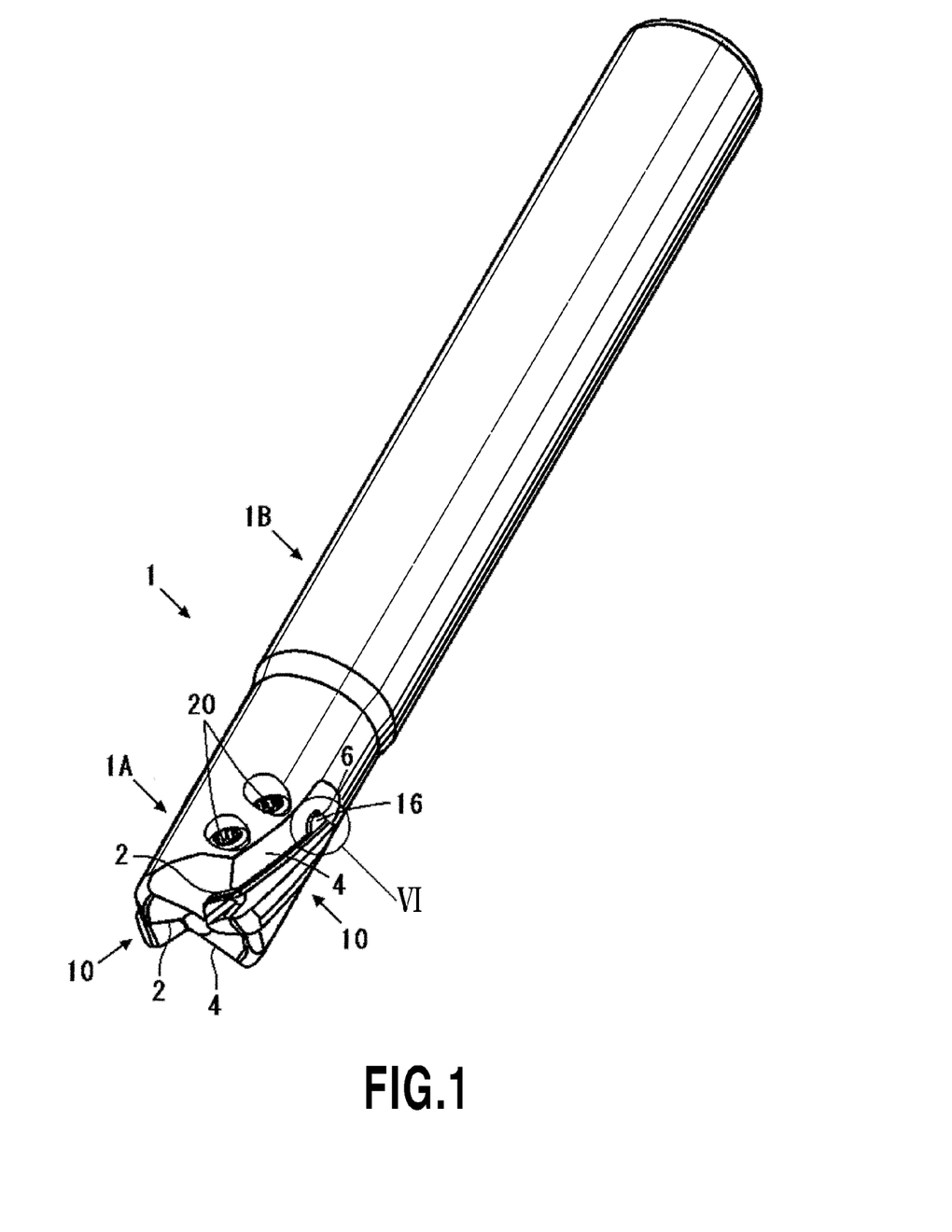
FIG. 1 is perspective view of an indexable end mill to which the present invention is applied.
Figure 2:
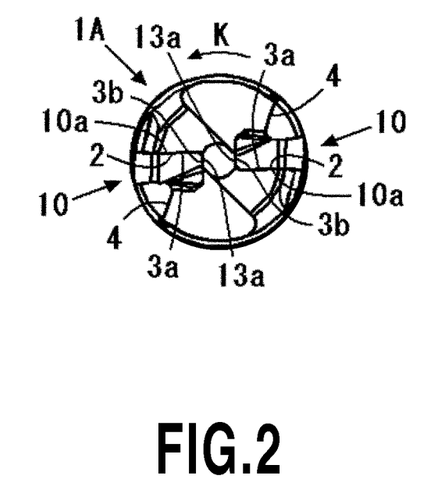
FIG. 2 is a front view of the end mill shown in FIG. 1 as viewed from a front end side.
Figure 3:
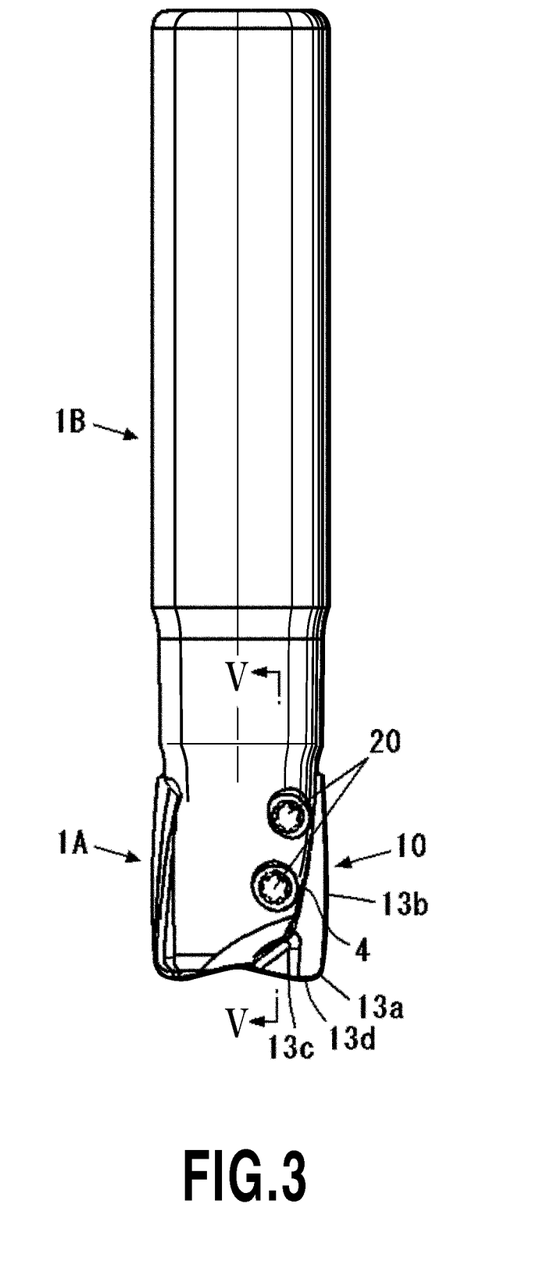
FIG. 3 is a plan view of the end mill shown in FIG. 1.
Figure 4:
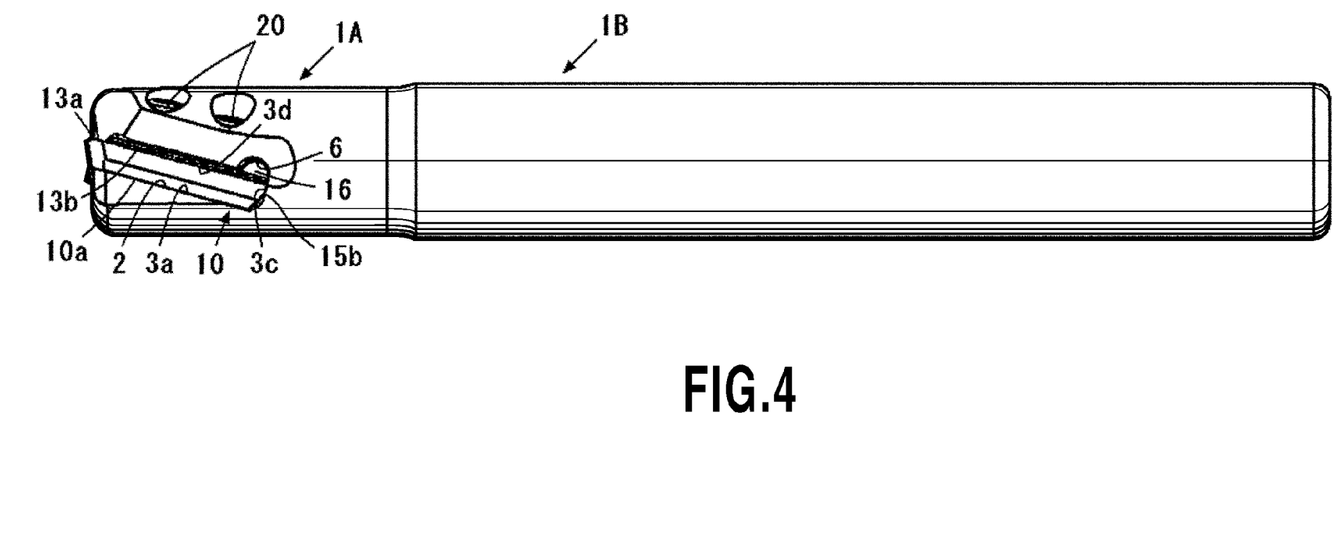
FIG. 4 is a right side view of the end mill shown in FIG. 1.
Figure 5:
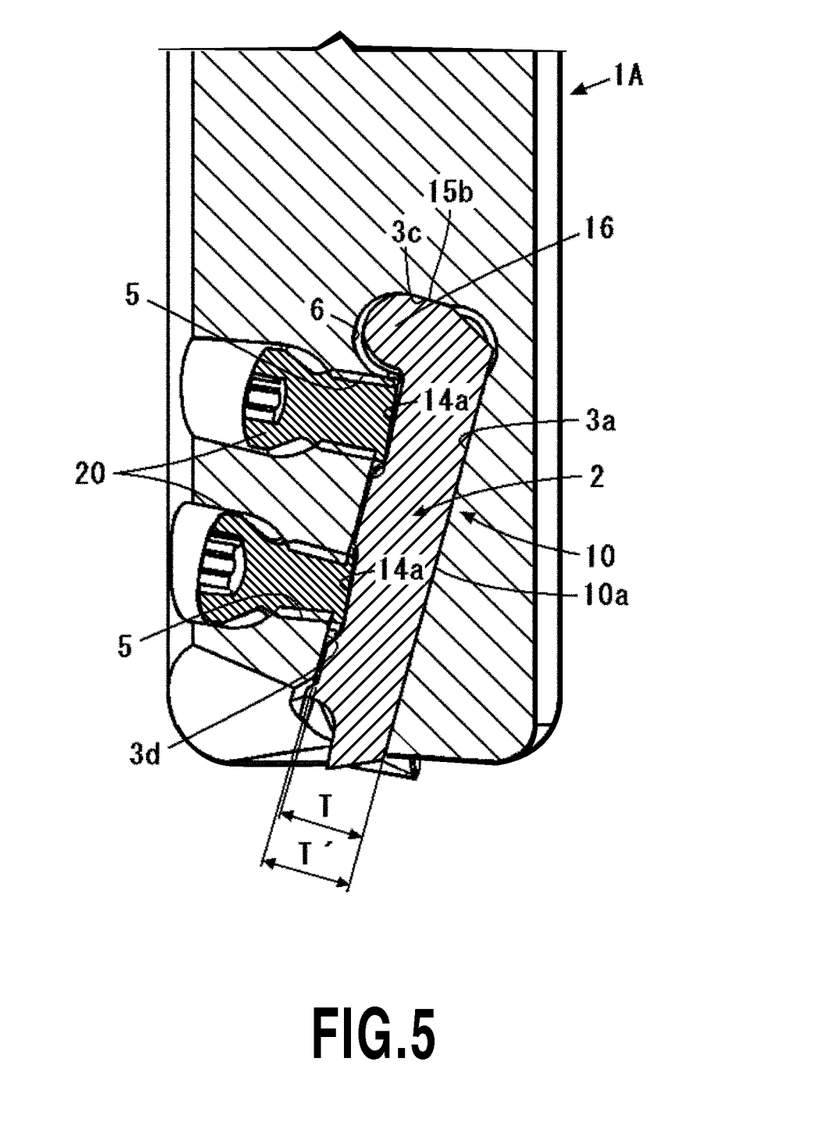
FIG. 5 is an enlarged cross section taken along line V-V shown in FIG. 3.
Figure 6:
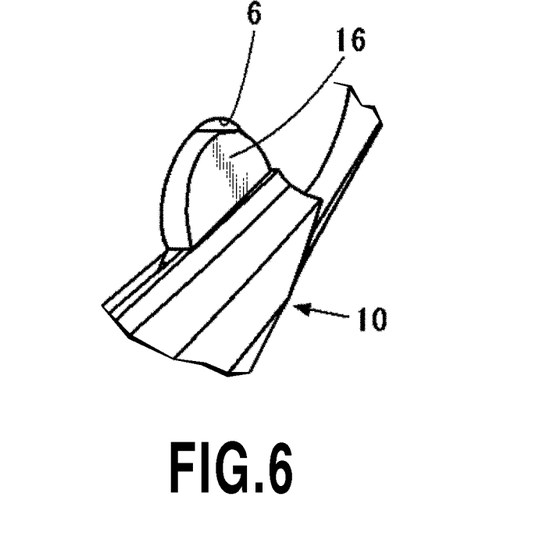
FIG. 6 is an enlarged view of a VI portion shown in FIG. 1.
Figure 7:
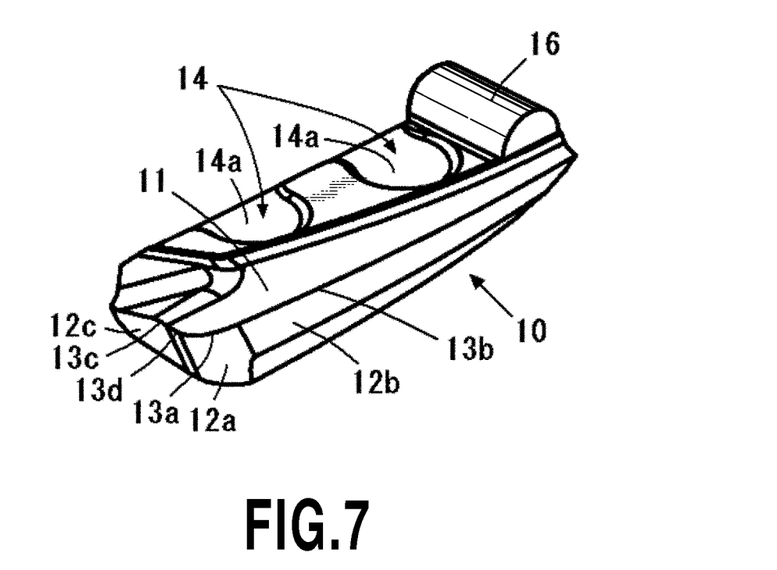
FIG. 7 is a perspective view of a cutting tip used in the end mill shown in FIG. 1.
Figure 8:
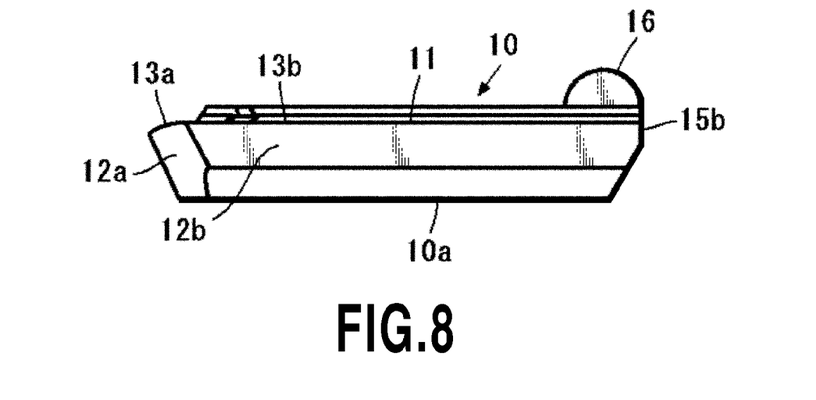
FIG. 8 is a front view of the cutting tip shown in FIG. 7.
Figure 9:
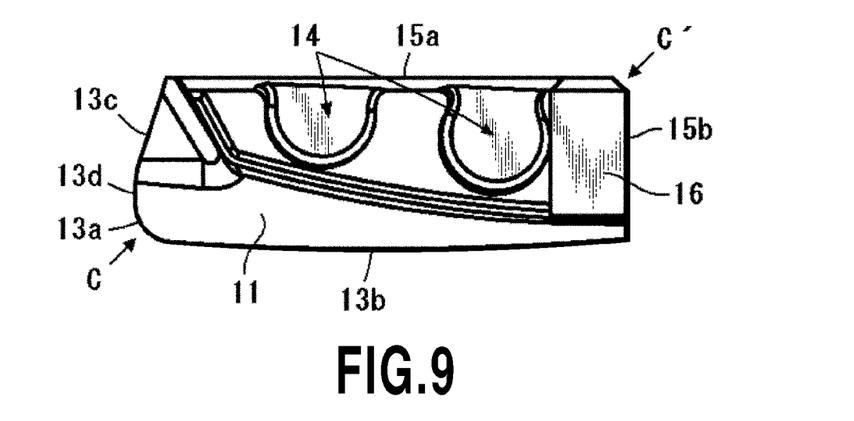
FIG. 9 is a plan view of the cutting tip shown in FIG. 7.
Figure 10:
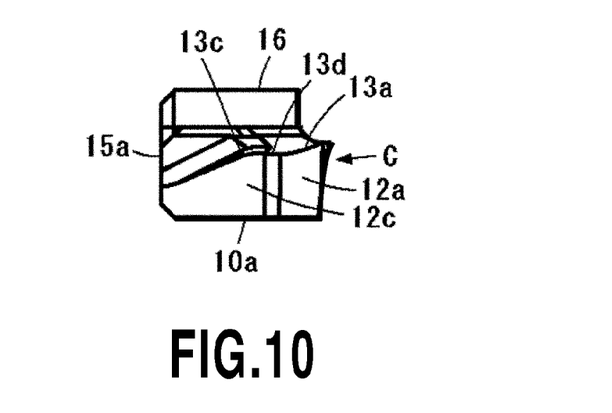
FIG. 10 is a left side view of the cutting tip shown in FIG. 7.

As to an embodiment of the present invention, a temporary coupling mechanism for a cutting tip to which the present invention is applied and an indexable end mill (hereinafter, called an end mill) equipped with the mechanism will be explained with reference to the accompanying drawings. FIG. 1 is a perspective view showing the end mill as viewed from a front end side. FIG. 2 is a front view of the end mill shown in FIG. 1 as viewed from a front end side. FIG. 3 and FIG. 4 each are a plan view and a right side view of the end mill shown in FIG. 1. FIG. 5 is an enlarged cross section taken along line V-V shown in FIG. 3. FIG. 6 is an enlarged view of a VI portion shown in FIG. 1. FIG. 7 is a perspective view of an indexable cutting tip (hereinafter, called a cutting tip) used in the end mill shown in FIG. 1. FIG. 8 is a front view of the cutting tip shown in FIG. 7. FIG. 9 and FIG. 10 each are a plan view and a left side view of the cutting tip shown in FIG. 7.

As shown in FIG. 1 to FIG. 4, a tool body 1 of the present end mill is formed substantially in a shaft shape and comprises a cutting part 1A at an axial front end side and a shank portion 1B at an axial back end side. A tip mounting seat 2 in a concave-groove shape opened to an outer peripheral face and a front end face of the cutting part 1A is provided in a front end portion of the cutting part 1A. The tip mounting seat 2 extends slightly inclined to the axial line such that an axial back end portion thereof is positioned backward of a front end portion thereof in a tool rotational direction K (refer to FIG. 4). Cutting tip pockets 4 are formed in the forward side of the tip mounting seat 2 in the tool rotational direction. The tip pocket 4 is formed by cutting away the outer peripheral face of the cutting part 1A along a direction of extending the tip mounting seat 2.

As shown in FIG. 7 to FIG. 10, the cutting tip 10 has a substantially rectangular plate-shaped tip body in a plan view (FIG. 9). A cutting face 11 is formed on a top face of the cutting tip 10, a seat face 10a is formed on a lower face thereof and flank faces 12a, 12b and 12c are formed on side faces intersecting with the top face and the lower face. An arc-shaped corner cutting edge 13a is formed in a corner portion C which is one section of the substantially rectangular top face on which the cutting face 11 is formed. A major cutting edge 13b and a minor cutting edge 13c are formed respectively on a long side and a short side of the rectangular top face. The long side and the short side respectively extend from the corner cutting edge 13a. The cutting face 11 is formed in such a manner as to be connected to the ridge line of the major cutting edge 13b and recessed in the lower face side to form a curved face. The rake angle of the cutting face 11 is positive, which is defined by a tangential line formed in the curved face at the ridgeline of the major cutting edge 13b. The corner cutting edge 13a and the minor cutting edge 13c are formed corresponding to the curved cutting face 11 by curved cutting edges recessed in the lower face side. It is preferable to provide a linear or arc-shaped flat cutting edge 13d in a portion of the minor cutting edge 13c neighbored to an end portion of the corner cutting edge 13a for improving surface roughness of a finish surface. Respective flank faces 12a, 12b and 12c formed in side faces extending respectively from the corner cutting edge 13a, the major cutting edge 13b and the minor cutting edge 13c are defined as flank faces each having a positive flank angle inclined inward toward the lower face side.

Hereinafter, a major construction of the temporary coupling mechanism for the cutting tip will be explained.

As shown in FIG. 9, the cutting tip 10 has the substantially rectangular top face. On the top face, another corner portion C' is positioned at an opposing angle of the corner portion C where the corner cutting edge 13a is formed. A long side of the rectangle extends from the another corner portion C', and concave portions 14 as recessed toward the lower face side are provided in a portion of the top surface extending from the long side. The concave portions 14 are provided at two locations as to have a clearance therebetween along the long side. A bottom face 14a of the concave portion 14 is defined as a flat face vertical to a center axis line of a female screw shown in FIG. 5. In addition, as apparent from FIG. 8 to FIG. 10, flat faces substantially at right angles to the lower face are formed on side faces respectively extending from the another corner portion C'. The flat faces are defined as restricted faces 15a and 15b respectively contacting with restricting wall faces 3b and 3c of the tip mounting seat 2 described later.

Further, as shown in FIG. 7 to FIG. 10, a convex portion 16 is provided so as to extend along a short side of the rectangle extending from the other corner portion C'. The convex portion 16 contacts with the short side and rises upward. The convex portion 16 has a semi-circle-shape in cross section and is formed in a hog-backed shape such that the highest position of the convex portion 16 is higher than the top face of the cutting tip 10 in the thickness direction of the cutting tip 10.

On the other hand, as shown in FIG. 1 to FIG. 4, the tip mounting seat 2 provided in the cutting part 1A is formed in a concave-groove shape to open to the outer peripheral face and the front end face of the cutting part 1A. A seat face 3a is formed on a side wall face directed in a rotational direction K of the tool body 1 to contact with the seat face 10a of the cutting tip 10. The restricting wall faces 3b and 3c are respectively formed on a bottom face directed to an outer peripheral side and a wall face directed to a front end side to contact with the restricted faces 15a and 15b of the cutting tip 10. A clearance T' between the seat face 3a and a side wall face 3d opposing it is slightly larger than a thickness T of the cutting tip 10. When the cutting tip 10 is seated on the seat face 3a of the tip mounting seat 2, a slight gap is generated between the top face and the side wall face 3d of the cutting tip 10. Two female holes 5 are provided on the outer peripheral face of the cutting part 1A positioned forward of the tip pocket 3 in the tool rotational direction K. Two female holes 5 open to the side wall face 3d at positions exposed to the two concave portions 14 provided in the cutting tip 10. These female holes 5 are provided at two locations so as to be exposed to the concave portions 14 of the cutting tip 10 seated on the tip mounting seat 2.

Further, a concave groove 6 into which the convex portion 16 of the cutting tip 10 can be inserted and fitted (insert-fit) is formed in the intersection portion between the side wall face 3d directed to an opposing side to the rotational direction of the tool body 1 and the restricting wall face 3c directed to the front end side of the tool body 1. The concave groove 6 is provided to extend from an opening end of the tip mounting seat 2 over the bottom face in which the restricting wall face 3b is formed. In some embodiments, the concave groove and the convex portion have complementary shapes.

The mounting and removal method of the cutting tip 10 in the indexable end mill equipped with the temporary coupling mechanism for the cutting tip 10 described above will be hereinafter explained. The insert of the cutting tip 10 into the tip mounting seat 2 is performed while inserting and fitting the convex portion 16 of the cutting tip 10 into the concave groove 6 of the tip mounting seat 2. In a state where the convex portion 16 is thus being inserted and fitted into the concave groove 6, the restricted faces 15a and 15b of the cutting tip 10 contact with the restricting wall faces 3b and 3c or come close to them having a slight clearance therebetween. Therefore, the cutting tip 10 can be smoothly inserted into or removed from the tip mounting seat 2. The cutting tip 10 moves in an extending direction of the concave groove 6 and is inserted into the tip mounting seat 2. The cutting tip 10 thus inserted into the tip mounting seat 2 is fixed in such a manner that screw members 20 such as hexagon socket setscrews (JIS B 1177) are threaded into female screw holes 5 at two locations provided in the cutting part 1A, and the front end face of the screw member 20 contacts with the bottom face 14a of the concave portion 14 in the cutting tip and presses the cutting tip 10 toward the seat face 3a of the tip mounting seat. In a case where a central line of each of the female screw hole 5 and the screw member 20 is herein in parallel with a perpendicular line of the seat face 3a of the tip mounting seat 2, the cutting tip 10 is simply pressed toward the seat face 3a of the tip mounting seat 2. As shown in FIG. 5, however, in a case where the central line of each of the female screw hole 5 and the screw member 20 is inclined to the perpendicular line in such a manner that as these center lines come closer to the seat face 3a of the tip mounting seat 2, these center lines gradually come closer to the two restricting wall faces 3b and 3c, the cutting tip 10 is pressed against the seat face 3a of the tip mounting seat and at the same time is also pressed against the two restricting wall faces 3b and 3c. In reverse, the removal of the cutting tip 10 from the tip mounting seat 2 is performed in such a manner that after the screw member 20 is loosened to leave the front end portion of the screw member 20 away from the bottom face 14a of the concave portion in the cutting tip, the cutting tip 10 is moved in the extending direction of the concave groove 6 to be removed from the tip mounting seat 2.

The cutting tip 10 installed in the tool body 1 is arranged such that the cutting face 11 is directed to the forward side in the rotational direction K of the tool body 1 and the corner cutting edge 13a protrudes from the outer peripheral face and the front end face of the tool body 1. The indexable end mill rotated around a center line of the tool body 1 is fed in a direction at right angles to the center line to a workpiece to cut the workpiece with the corner cutting edge 13a, the major cutting edge 13b and the minor cutting edge 13c, thus machining the workpiece to be in a desired shape.

An operational effect of the indexable end mill will be hereinafter explained.

In a case of inserting the cutting tip 10 into the tip mounting seat 2 and taking the cutting tip 10 out of the tip mounting seat 2, since the convex portion 16 of the cutting tip 10 is inserted and fitted into the concave groove 6 of the tip mounting seat 2, the cutting tip 10 is movable only in the extending direction of the concave groove 6 and is not movable in the other direction. In the indexable end mill, the concave groove 6 extends in a direction substantially at right angles to the center line of the tool body 1 to particularly inhibit the movement of the cutting tip 10 in the center line direction. In consequence, in a case of performing replacement or corner change of the cutting tip 10 in a state of mounting the indexable end mill on a tool machine where a main axis is arranged in a vertical direction, such as a vertical cutting mill or a vertical machining center, the cutting tip 10 inserted into the tip mounting seat 2 does not drop due to an effect of gravity. Further, since it is not necessary to hold the cutting tip 10 by hand for the cutting tip not to drop, the replacement operation of the cutting tip 10 becomes easy and the operation time is shortened. In the indexable end mill where the center line of the tool body is thus made in parallel with the vertical direction, for preventing the cutting tip 10 from dropping from the tip mounting seat 2, it is preferable that an angle between the extending direction of the concave groove 6 of the tip mounting seat 2 and the direction of the center line of the tool body 1 is in a range of 60 degrees to 90 degrees.

In the indexable end mill, since the convex portion 16 of the cutting tip is provided so as to extend along the short side of the top face, when the cutting tip 10 is inserted into the tip mounting seat 2, the convex portion 16 is engaged to the concave groove 6 of the mounting seat 2 substantially over an entire length in the extending direction of the concave groove 6, thus, making it possible to prevent the cutting tip 10 from largely moving back and forth within the tip mounting seat 2. Even if the convex portions 16 of the cutting tip are scattered at two or more locations in the longitudinal direction of the concave groove 6, the effect similar to the above can be obtained. The convex portion 16 of the cutting tip is not limited thereto, but may be provided at one location so long as it can be inserted and fitted into the concave groove 6. In this case, if the concave groove 6 of the tip mounting seat 2 is provided in parallel with either one of the restricting wall faces 3b and 3c, the back and forth movement of the cutting tip 10 can be prevented, since the restricting wall faces 3b and 3c and the restricted faces 15a and 15b corresponding to them contact with each other or come close as having a slight clearance therebetween at the time of inserting the cutting tip 10 into the tip mounting seat 2.

The center line of each of the female screw hole 5 and the screw member 20 threaded into the female screw 5 is inclined to the perpendicular line of the seat face 3a in such a manner that as the center line comes closer to the seat face 3a of the tip mounting seat, the center line gradually comes close to the two restricting wall faces 3b and 3c. As a result, the cutting tip 10 is urged and pressed against the two restricting wall faces 3b and 3c at the time of fastening the screw member 20. Therefore, even if an operator does not forcibly press the cutting tip 10 against the two restricting wall faces 3b and 3c by hand, the cutting tip 10 can be securely and stably fixed to the tip mounting seat 2.

It is preferable that the maximum raised height of the convex portion 16 to the top face of the cutting tip 10 is within a range of 0.2 to 2 mm. In a range of less than 0.2 mm, the convex portion 16 of the cutting tip is not engaged to the concave groove 6 of the tip mounting seat 2 or is engaged insufficiently, the cutting tip 10 possibly drops from the tip mounting seat 2. When the maximum raised height of the convex portion exceeds 2 mm, since it is difficult to mold the convex portion 16 and the concave groove 6 in a cutting tip manufactured by a powder metallurgical method, productivity is possibly degraded. The convex portion 16 and the concave groove 6 serve to prevent the cutting tip 10 from moving in a predetermined direction within the tip mounting seat 2 and do not serve to position the cutting tip 10 in a predetermined position. Therefore, it is not necessary to exactly manage a relative position relation between the convex portion 16 and the concave groove 6, greatly facilitating the manufacture of the convex portion 16 and the concave groove 6.

It is preferable that when the convex portion 16 is inserted into the concave groove 6, the cross sectional configuration of the convex portion 16 is made to an analogous configuration smaller than the cross sectional configuration of the concave groove 6 in consideration of secure engagement therebetween. It is preferable that, for making it easy to insert the convex portion 16 into the concave groove 6, the cross sectional configuration of the opening in the tip mounting seat 2 which is an inlet side of the concave groove 6 is larger than the other cross sectional configuration or the cross sectional configuration of the convex portion 16 at the forward portion in the inserting and fitting direction of the concave groove 6 is smaller than the other cross sectional configuration.

In the temporary coupling mechanism for the cutting tip described above and the indexable end mill equipped with the mechanism, the convex portion 16 is provided in the cutting tip 10 and the concave groove 6 is provided in the side wall face 3d of the tip mounting seat 2, but in reverse, the convex portion 16 may be provided in the side wall face 3d of the tip mounting seat 2 and the concave groove 6 may be provided in the cutting tip 10. In addition, the convex portion 16 or the concave groove 6 may be provided in the lower face side of the cutting tip 10 and corresponding thereto, the convex portion 16 or the concave groove 6 may be provided in the seat face 3a of the tip mounting seat 2.

Figure 11A:
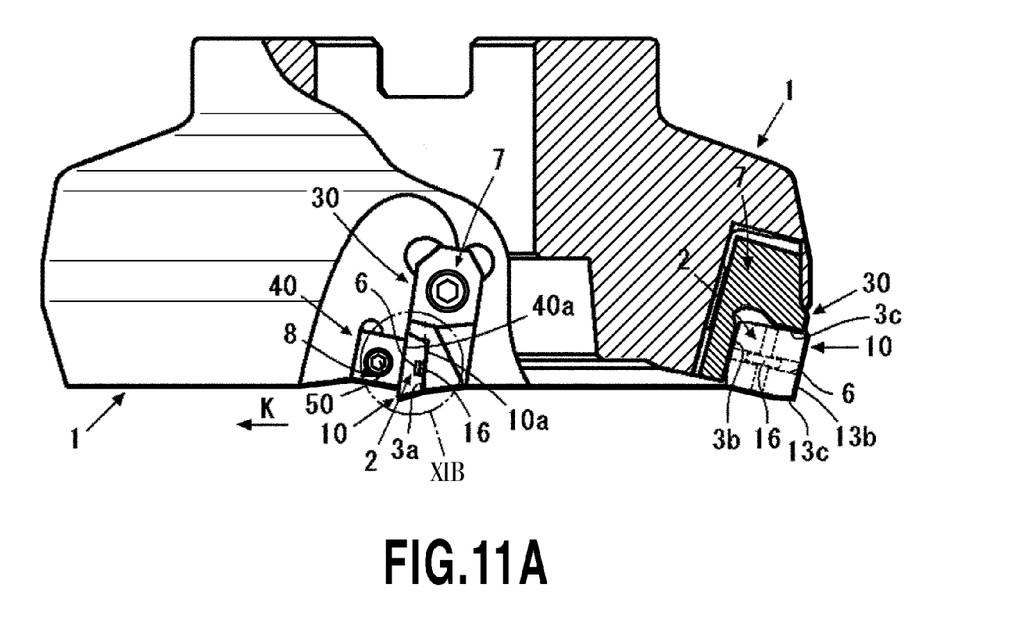
FIG. 11A is a partial cross sectional side view of an indexable face milling cutter to which the present invention is applied.
Figure 11B:
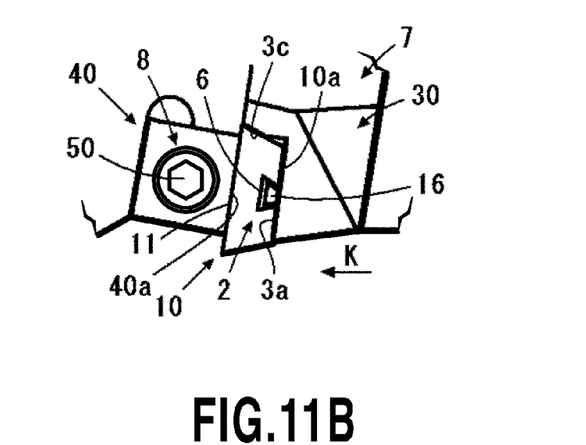
FIG. 11B is an enlarged view of an XIB portion in FIG. 11A.
Figure 12:
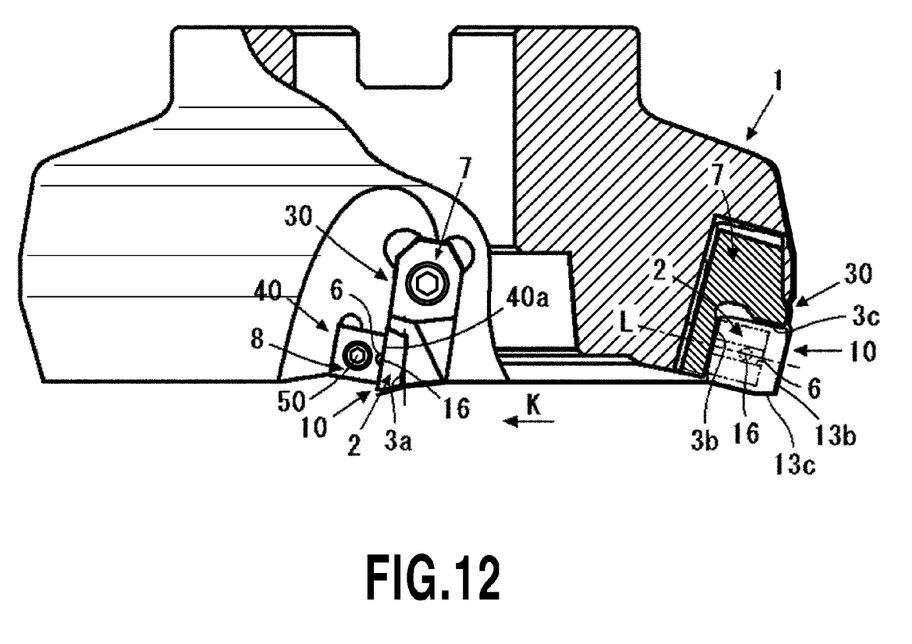
FIG. 12 is a partial cross sectional side view of another indexable face milling cutter to which the present invention is applied.

The temporary coupling mechanism for the cutting tip according to the present invention and the indexable end mill equipped with the mechanism are not limited to the construction where the tip mounting seat 2 is formed in a concave-groove shape and can be applied to the tip mounting seat 2 comprising a notch step portion. FIG. 11A, FIG. 11B and FIG. 12 show an indexable face milling cutter to which another temporary coupling mechanism for a cutting tip is applied. In these figures, components identical to those in the indexable end mill described above are referred to using the same reference numerals and a detail thereof is omitted.

The face milling cutter is configured such that plural cutting tips 10 are arranged through support members 30 (sometimes referred to as "cartridges") along a circumferential direction of the tool body 1 on an outer peripheral face of the front end portion thereof formed substantially in a disc shape. Each cutting tip 10 is seated on the tip mounting seat 2 comprising the notch step portion formed in the front end portion of the wall face in the support member 30 directed forward in the tool rotational direction K. A wedge member 40 is inserted into a wedge member inserting groove provided at the forward side of the seated cutting tip 10 in the tool rotational direction K. By sinking the wedge member 40 inside the tool body 1 (inside the tool body 1 in a radial direction) using the screw member 50, the cutting tip 10 is fixed so as to be interposed between the pressing face 40a of the wedge member 40 and the seat face 3a of the tip mounting seat.

Hereinafter, a major construction of the temporary coupling mechanism for the cutting tip will be explained.

The cutting tip 10 used in the face milling cutter is formed in a plate-like shape of a substantially square as shown in a right lower corner portion in FIG. 11A, where the cutting face 11 is formed on a top face (face in a near side of a sheet) of the cutting tip 10, a seat face 10a is formed on a lower face (face in a remote side of a sheet) of the cutting tip 10, and flank faces (refer to 12b and 12c in FIG. 7 to FIG. 10) each having a positive flank angle inclined toward the inside are formed in side faces of the cutting tip 10 extending from the top face toward the lower face. Minor cutting edges 13c are formed in ridge lines of four corner portions C on the square top face having the cutting face 11 thereon, and major cutting edges 13c are formed in four section ridge portions of the square top face. Further, as viewed from a direction opposed to the lower face on which the seat face 10a is formed, two concave grooves 6 are formed on the lower face. The concave grooves 6 are arranged to form a crossed shape intersecting in the central portion of the lower face. Each concave groove 6 extends in parallel with the section ridge portion of the square top face and has both end portions opened to the side face of the cutting tip 10 to form a rectangular cross sectional configuration.

The tip mounting seat 2 is provided with the seat face 3a on which the cutting tip 10 is seated and two wall faces rising up from the seat face 3a. The two restricting wall faces 3b and 3c contacting with the side faces of the cutting tip 10 which are the restricted wall faces (refer to 15a and 15b in FIG. 9) are formed on the two wall faces. Further, as shown in FIG. 11A, the convex portion 16 projecting from the seat face 3a is formed on the seat face 3a of the tip mounting seat 2. As viewed from a direction opposing the seat face 3a, the convex portion 16 is configured to extend in parallel with the restricting wall face 3c. The convex portion 16 has a rectangular cross sectional configuration slightly smaller than the concave groove 6, and is capable of being inserted and fitted into the concave groove 6 of the cutting tip inserted into the tip mounting seat 2. The cutting tip 10 is fixed by sinking the wedge member 40 inside the tool body 1 (radial inside of the tool body 1) in a state of inserting and fitting the convex portion 16 into the concave groove 6 to press the top face of the cutting tip 10 toward the seat face 3a of the tip mounting seat 2 with the pressing face 40a of the wedge member 40.

In a case of mounting and taking out the cutting tip 10 into and from the face milling cutter, the insert of the cutting tip 10 into the tip mounting seat 2 is performed while inserting and fitting the convex portion 16 provided in the tip mounting seat 2 into the concave groove 6 provided in the cutting tip 10. The wedge member 40 herein is in a floating state toward the outside of the tool body 1 (radial outside of the tool body 1) as having a clearance between the pressing face 40a of the wedge member 40 and the top face of the cutting tip 10. In a state where the convex portion 16 is thus being inserted and fitted into the concave groove 6, the restricted faces 15a and 15b of the cutting tip 10 contact with the restricting wall faces 3b and 3c or come close thereto having a slight clearance therebetween. Therefore, the cutting tip 10 can be smoothly inserted into or taken out of the tip mounting seat 2. The cutting tip 10 moves in an extending direction of the concave groove 6 to be inserted into the tip mounting seat 2. The cutting tip 10 thus inserted into the tip mounting seat 2 is fixed by sinking the wedge member 40 inside the tool body 1 (radial inside of the tool body 1) to press the top face of the cutting tip 10 toward the seat face 3a of the tip mounting seat with the pressing face 40a of the wedge member. In reverse, the removal of the cutting tip 10 from the tip mounting seat 2 is performed in such a manner that after the pressing face 40a of the wedge member is separated away from the top face of the cutting tip 10 by floating the wedge member 40 outside the tool body 1 (radial outside), the cutting tip 10 is moved in the extending direction of the concave groove 6 to be taken out from the tip mounting seat 2.

In the temporary coupling mechanism for the cutting tip described above, the cross sectional configuration of each of the concave groove 6 formed on the lower face of the cutting tip 10 and the convex portion 16 formed in the tip mounting seat is not limited to the rectangular configuration. As seen in FIG. 11B, the convex portion 16 and the convex groove 6 can be engaged to each other so as to form a dovetail connection. They may thus be formed in a reversely tapered shape where the cross sectional configuration expands toward the upward side from the seat face 3a of the tip mounting seat. In this case, since the floating of the cutting tip 10 in a direction of leaving away from the seat face 3a of the tip mounting seat can be restricted, the dropping or the missing of the cutting tip 10 from the tip mounting seat 2 can be remarkably effectively prevented.

As exemplified in FIG. 12, the convex portion 16 may be provided on the top face of the cutting tip 10 in the face milling cutter. Corresponding to this configuration, the concave groove 6 into which the convex portion 16 is inserted and fitted is formed so as to be recessed from the pressing face 40a of the wedge member. The concave groove 6 is provided to extend in parallel with a direction (dashed line L in FIG. 12) where the wedge member 40 floats and sinks as viewed from a direction opposing the seat face 3a of the tip mounting seat and is formed such that at least one end portion positioned in a radial outside of the tool body 1 is opened. Thus, the concave groove 6 extends along a direction of movement of the wedge member 40 when the wedge member is tightened or loosened, and opens to a non-pressing top face thereof. The convex portion 16 is formed in a semi sphere so as to be raised from the top face of the cutting tip 10 and is configured such that a position of the convex portion 16 does not change at the time of the corner change of the cutting tip by arranging the convex portion 16 in a substantially central portion of the square face as the top face of the cutting tip 10.

The clamping member of the cutting tip 10 is not limited to the wedge member 40 described above and can be replaced by coupling means in the form of interposing the cutting tip 10 together with the seat face 3a of the tip mounting seat. For example, the clamping member may be a pressing member for pressing the top face of the cutting tip 10 toward the seat face 3a of the tip mounting seat (not shown).

The present invention is not applied so as to be limited to a rotating tool such as the end mill or face milling cutter described above, but can be applied to a cutting tool in the form of removably installing the cutting tip, for example, a turning tool such as a bite tool and a boring tool or a drilling tool such as a drill and a reamer without mentioning.

What is claimed is:

1. A temporary coupling mechanism for a cutting tip inserted into a tip mounting seat provided in a tool body of a cutting tool, comprising:
   a tip mounting seat including a notch step portion or a concave groove equipped with a seat face and at least one restricting wall face rising up from the seat face;
   a clamping member for pressing the cutting tip inserted into the tip mounting seat toward the seat face;
   at least one of a concave groove or at least one convex portion located in a predetermined position of the cutting tip; and
   a convex portion or a concave groove provided in at least one of the tip mounting seat and the clamping member to be capable of being engaging to the concave groove or the convex portion of the cutting tip,
   wherein the concave groove extends substantially in parallel with the seat face of the tip mounting seat, and
   the convex portion is inserted and fitted into the concave groove so as to be engaged thereto when the cutting tip is inserted into the tip mounting seat and is taken out of the tip mounting seat, causing the cutting tip to be movable only in a predetermined direction relative to the tip mounting seat, said predetermined direction being along an extending direction of the concave groove.

2. A temporary coupling mechanism for a cutting tip according to claim 1, wherein the concave groove extends in a direction along at least the one restricting wall face.

3. A temporary coupling mechanism for a cutting tip according to claim 1, wherein the convex portion extends or is scattered in a direction along at least the one restricting wall face.

4. A temporary coupling mechanism for a cutting tip according to claim 1, wherein a cross sectional configuration of the convex portion is analogous to a cross sectional configuration of the concave groove.

5. A cutting tool equipped with the temporary coupling mechanism for the cutting tip according to claim 1.

6. A cutting tool according to claim 5, wherein a size of the cross sectional configuration in the concave groove relative to that of the cross sectional configuration in the convex portion is larger at an outer side end portion of the concave groove positioned at an outer side end of the tool body in the cutting tool than at an inner side end portion of the concave groove positioned at an inner side of the tool body in the cutting tool.

7. A cutting tool according to claim 5, wherein the concave groove extends in a direction intersecting with a vertical direction.

8. A cutting tool according to claim 5, wherein the concave groove extends in a direction intersecting at 60 degrees to 90 degrees with a vertical direction.

9. A cutting tool having a temporary coupling mechanism and comprising:
- a tool body having a center line around which the tool body rotates, the tool body having a cutting part at a forward end thereof, the cutting part provided with at least one tip pocket which opens out to said forward end; and
- a cutting tip located in the tip pocket, the cutting tip configured to be secured in the tip pocket by at least one clamping member;

wherein:
the tip pocket comprises a first coupling portion;
the cutting tip comprises a second coupling portion;
the first coupling portion and the second coupling portion are engaged to one another; such that:
- when the tool body is oriented such that tool body center line extends in a vertical direction with said forward end facing in a downward direction, engagement of the first coupling portion to the second coupling portion prevents the cutting tip from dropping out of the tip pocket due to an effect of gravity, even in the absence of the clamping member securing the cutting tip to the tip pocket; and
- the cutting tip is movable only in a predetermined direction relative to the tip pocket;

the tip pocket's first coupling portion comprises a concave groove, the concave groove extending in a direction transverse to the tool body's center line and opening out to a peripheral face of the tool body;
the cutting tip's second coupling portion comprises at least one convex portion which extends in a direction transverse to the tool body's center line, when the cutting tip is loosely retained in the tip pocket;
the cutting tip has a substantially rectangular top face with long sides and short sides; and
the at least one convex portion is formed on the top face of the cutting tip, along a short side thereof.

10. The cutting tool according to claim 9, wherein:
the first and second coupling portions have complementary shapes.

11. The cutting tool according to claim 9, wherein:
a substantially entire length of the at least one convex portion is engaged to the concave groove in the direction along which the concave groove extends.

12. The cutting tool according to claim 9, wherein:
an angle formed between the direction in which the concave groove extends, and the tool body's center line, is in a range of 60 degrees to 90 degrees.

13. The cutting tool according to claim 9, wherein:
the at least one clamping member comprises a pair of screw members configured to pass through a periphery of the tool body and press the cutting tip against a tip mounting seat of the tip pocket.

14. A cutting tool having a temporary coupling mechanism and comprising:
- a tool body having a center line around which the tool body rotates, the tool body having a cutting part at a forward end thereof, the cutting part provided with at least one tip pocket which opens out to said forward end; and
- a cutting tip located in the tip pocket, the cutting tip configured to be secured in the tip pocket by at least one clamping member;

wherein:
the tip pocket comprises a first coupling portion;
the cutting tip comprises a second coupling portion;
the first coupling portion and the second coupling portion are engaged to one another; such that:
- when the tool body is oriented such that tool body center line extends in a vertical direction with said forward end facing in a downward direction, engagement of the first coupling portion to the second coupling portion prevents the cutting tip from dropping out of the tip pocket due to an effect of gravity, even in the absence of the clamping member securing the cutting tip to the tip pocket; and
- the cutting tip is movable only in a predetermined direction relative to the tip pocket;

the at least one clamping member comprises a wedge member secured to the tool body; and
the wedge member is configured to abut a top face of the cutting tip and press a seat face of the cutting tip against a tip mounting seat of the tip pocket.

15. The cutting tool according to claim 14, wherein:
the first coupling portion is formed on a seat face of the tip mounting seat; and
the second coupling portion is formed on a lower face of the cutting tip.

16. The cutting tool according to claim 15, wherein:
the cutting tip has a substantially square top face provided with four major cutting edges and side faces extending from the top face to the lower face;
the lower face of the cutting tip is provided with two concave grooves arranged to form a crossed shape intersecting in a central portion of the lower face, each concave groove having both end portions thereof opened to opposing sides faces; and
the second coupling portion comprises one or both of the concave grooves.

17. The cutting tool according to claim 16, wherein:
the first coupling portion and the second coupling portion form a dovetail connection to thereby prevent the cutting tip from dropping out of the tip mounting seat.

18. The cutting tool according to claim 14, wherein:
the first coupling portion comprises a concave groove formed on a pressing face of the wedge member; and
the second coupling portion comprises a convex portion formed on a top face of the cutting tip.

19. The cutting tool according to claim 18, wherein:
the concave groove extends along a direction of movement of the wedge member, when the wedge member is tightened or loosened.

20. The cutting tool according to claim 14, wherein:
the tip pocket is formed on a support member secured to the tool body.

21. The cutting tool according to claim 14, wherein the cutting tool is a face milling cutter comprising a plurality of tip pockets arranged around a periphery of a milling cutter body.

22. The cutting tool according to claim 14, wherein:
the first coupling portion and the second coupling portion form a dovetail connection to thereby prevent the cutting tip from dropping out of the tip mounting seat.

* * * * *